_United States Patent Office_

3,155,682
Patented Nov. 3, 1964

3,155,682
PROCESS FOR 1,3-DITHIOLIUM DYESTUFFS AND INTERMEDIATES THEREFOR
Erwin Klingsberg, Mountainside, N.J., assignor to American Cyanamid Company, Stamford, Conn., a corporation of Maine
No Drawing. Filed Mar. 5, 1963, Ser. No. 262,844
10 Claims. (Cl. 260—327)

This invention relates to, and has for its object, the preparation of dyestuffs of the Formula I:

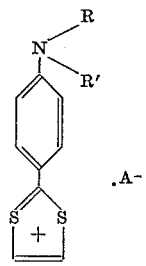

wherein R and R' are lower alkyl and A⁻ is the anion of a strong acid having a pKa below 4. These compounds, which are claimed in my copending application, Serial No. 262,845, filed on even date herewith (entitled "1,3-dithiolium Derivatives and Intermediates Therefor"), are useful colorants for polyacrylonitrile fibers and the like.

In accordance with the process of this invention, the known compound, 1,3-dithiole-2-thione, dissolved in an organic solvent such as acetone or acetic acid, is gradually treated with hydrogen peroxide or an organic peracid such as peracetic or perbenzoic acid. Reaction proceeds rapidly and a few minutes after addition is complete, the mixture may be worked up.

The new water-soluble product, 1,3-dithiolium hydrogen sulfate, may be converted to other new salts by treatment with an acid having a pKa below 4 such as perchloric, fluoboric, hydriodic, hydrobromic, p-toluene-sulfonic, picric or a nitrobenzoic acid.

The new 1,3-dithiolium salt is then condensed with a tertiary aromatic amine to yield the product of Formula I. Condensation may be effected at elevated temperatures in a solvent such as acetic acid or an alcohol. The product, which is a solid, may be purified by crystallization from a solvent such as acetic acid.

The following examples illustrate the invention.

EXAMPLE 1

_1,3-Dithiolium Hydrogen Sulfate_

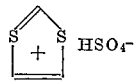

A solution of 2.0 g. of 1,3-dithiole-2-thione in 15 ml. of acetone is stirred in an ice bath and treated during one-half hour with a solution of 3.6 g. of 40% peracetic acid in 10 ml. of acetone. The mixture is stirred a few minutes longer and then filtered, giving about 2.5 g. of pale yellow water-soluble product.

EXAMPLE 2

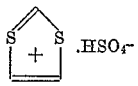

The product is obtained when the procedure of Example 1 is modified by replacing the peracetic acid with an equivalent quantity of either hydrogen peroxide or perbenzoic acid.

EXAMPLE 3

When the procedure of Example 1 is repeated identically except for the replacement of acetone with an equal volume of acetic acid, the product of Example 1 is obtained.

EXAMPLE 4

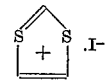

The product is obtained by dissolving one mole of 1,3-dithiolium hydrogen sulfate in propanol and adding a mole of hydriodic acid. The iodide is bright yellow and melts at 134–5° C. (dec. —AcOH).

The water soluble perchlorate salt and the water insoluble picrate (M.P. 115° C.) are similarly obtained by substitution of perchloric acid and picric acid, respectively, for the hydriodic acid used in Example 4.

EXAMPLE 5

_2-(p-Dimethylaminophenyl)-1,3-Dithiolium Iodide_

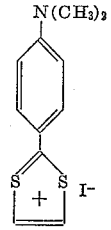

1,3-dithiolium iodide (0.25 g.) and dimethyl-aniline (0.4 ml.) are dissolved in 50 ml. of acetic acid with warming. A carmine color (violet fluorescence) forms at the boil. The solution is heated at reflux until the condensation is complete (about an hour). The product is isolated by filtration and washed with hot methanol. It dyes polyacrylonitrile bright pink.

I claim:
1. A process of preparing a compound of the formula:

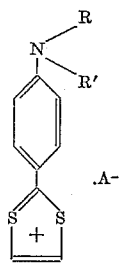

wherein R and R' are lower alkyl and A⁻ is an anion of a strong acid having a pKa below 4 and selected from the group consisting of perchloric, fluoboric, hydriodic, hydrobromic, p-toluene-sulfonic, picric and nitrobenzoic acids; by:
  (a) treating 1,3-dithiole-2-thione with a member selected from the group consisting of hydrogen peroxide and a peracid to obtain the 1,3-dithiolium hydrogen sulfate salt;
  (b) treating the dithiolium salt from (a) with a strong acid having a pKa below 4 and selected from the group consisting of perchloric, fluoboric, hydriodic, hydrobromic, p-toluene sulfonic, picric, and nitrobenzoic acids; and
  (c) condensing the compound obtained in (b) with a lower N,N-dialkylaniline; and recovering the condensation product.
2. The process of claim 1 wherein the R and R' radicals are each methyl.

3. The process of claim 1 wherein 1,3-dithiole-2-thione is treated with peracetic acid.

4. The process of claim 1 wherein step (*a*) is conducted at about 0° C.

5. The process of treating 1,3-dithiole-2-thione with a member selected from the group consisting of hydrogen peroxide and a peracid, and recovering the resulting 1,3-dithiolium salt.

6. The process which comprises condensing a 1,3-dithiolium salt with a lower N,N-dialkylaniline and recovering the product, 2-(p-lower dialkylaminophenyl)-1,3-dithiolium salt, thus formed.

7. A 1,3-dithiolium salt wherein the anion is of an acid having a pKa below 4 and selected from the group consisting of perchloric, fluoboric, hydriodic, hydrobromic, p-toluene-sulfonic, picric and nitrobenzoic acids.

8. 1,3-dithiolium hydrogen sulfate.

9. 1,3-dithiolium iodide.

10. 1,3-dithiolium picrate.

References Cited in the file of this patent

E. Klingsberg: Jour. Amer. Chem. Soc., 83 (2934–2937), 1961.

E. Klingsberg: Chem. and Ind., 1568 (1960).